United States Patent [19]

Gold

[11] Patent Number: 4,770,381

[45] Date of Patent: Sep. 13, 1988

[54] TEST TUBE RACK HOLDER

[75] Inventor: Paul Gold, St. Louis, Mo.

[73] Assignee: Gold Biotechnology, Inc., St. Louis, Mo.

[21] Appl. No.: 947,194

[22] Filed: Dec. 29, 1986

[51] Int. Cl.4 ............................................. F16M 11/00
[52] U.S. Cl. .................................. 248/172; 248/174; 248/499; 211/74
[58] Field of Search ............... 248/172, 152, 346, 310, 248/510, 499, 670, 139–142, 671, 154, 174; 211/74, 71

[56] References Cited

U.S. PATENT DOCUMENTS

| D. 180,364 | 5/1957 | Handin | 248/141 X |
|---|---|---|---|
| 600,464 | 5/1898 | Webster et al. | 248/141 |
| 1,755,745 | 4/1930 | Parr | 248/141 |
| 2,213,738 | 9/1940 | Larsen | 248/499 X |
| 2,471,512 | 5/1949 | Barlock | 248/141 X |
| 2,807,430 | 9/1957 | Medlock | 248/141 X |
| 2,899,162 | 8/1959 | Young | 248/140 |

FOREIGN PATENT DOCUMENTS 11217  9/1928  Australia ............................ 248/172

Primary Examiner—Alvin C. Chin-Shue
Attorney, Agent, or Firm—Senniger, Powers, Leavitt and Roedel

[57] ABSTRACT

A test tube rack holder for supporting a test tube rack on a rotary shaker, the holder comprising a base with a platform mounted on the base. A first side bar projects outwardly from the platform and a second side bar projecting outwardly from the platform generally parallel to the first side bar, the second side bar being laterally moveable with respect to the first side bar and defining a space on the platform between the interior sides of the side bars for receiving a test tube rack. The second side bar can be secured relative to the first side bar to fix the distance between the side bars to accommodate a test tube rack. A sheet of resilient material having first and second edges is secured at one edge to the holder exteriorly of the side bars and releasably secured at the other edge to the holder exteriorly of the side bars to retain a test tube rack on the platform between the side bars.

10 Claims, 4 Drawing Sheets

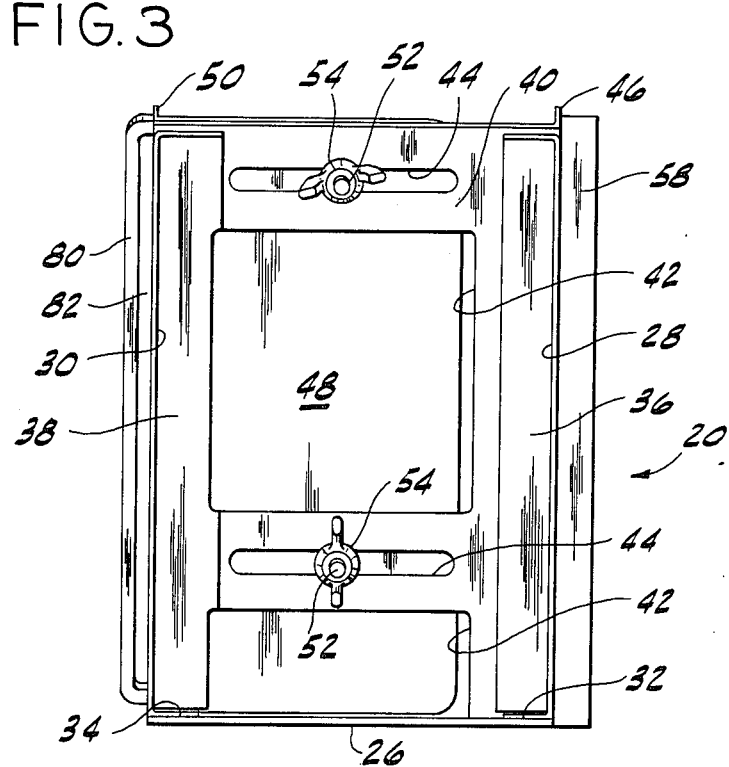
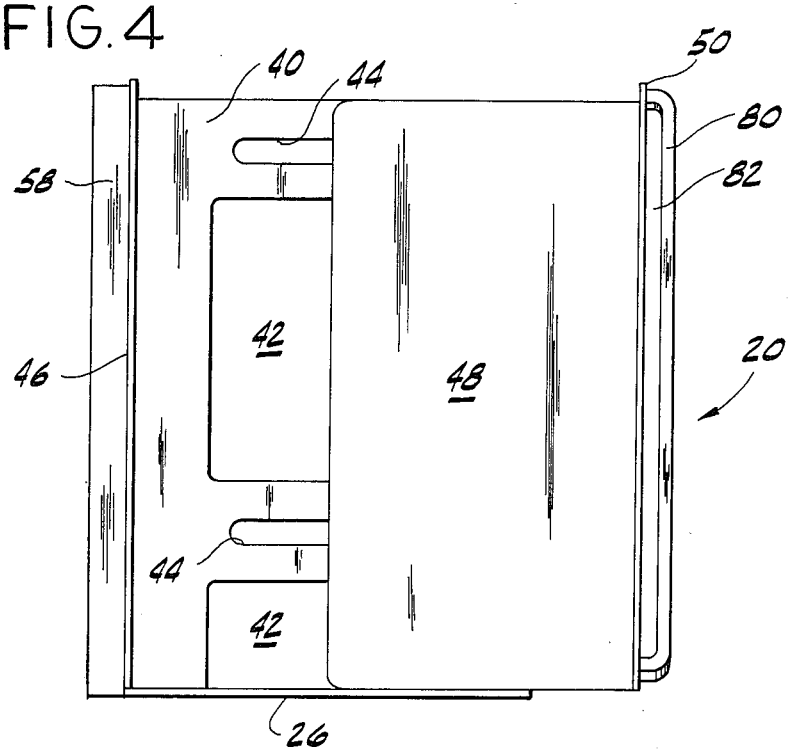

TEST TUBE RACK HOLDER

BACKGROUND OF THE INVENTION

This invention relates to a test tube rack holder and in particular to a device for holding a test tube rack on a rotary shaker.

In chemical, biochemical and other fields of research, a number of laboratory procedures require that the contents of test tubes be subjected to vigorous shaking or agitation for prescribed periods of time. Shakers such as rotary shakers are commercially available for this purpose. Where a large number of test tubes are to be subjected to identical conditions of shaking or agitation, it would greatly expedite processing and reduce the loss or breakage of individual tubes to be able to mount whole racks of test tubes on such shakers rapidly and securely. However, there has not heretofore been available simple, practical and effective means for securing individual test tubes or, more importantly, racks of test tubes to such shakers without spilling the contents thereof.

SUMMARY OF THE INVENTION

Among the objects of the present invention is the provision of a device for mounting a rack of test tubes to a shaker or similar piece of equipment; the provision of such a device that is easily adjustable to accommodate a wide range of sizes of racks, ranging from nearly empty to full; the provision of such a device that provides a fast and easy but secure mounting of the rack and the tubes; the provision of such a device that is of simple and inexpensive construction; the provision of such a device that in at least some embodiments is adjustable to hold the rack in a variety of angular orientations.

Generally, the test tube rack holder of this invention comprises a horizontal base and left and right vertical side members extending upwardly on opposite sides of the base. A platform extends between the side members, and has a first side bar projecting outwardly from the platform along one edge. A second side bar projects outwardly from the platform generally parallel to the first side bar, the second side bar being laterally movable with respect to the first side bar and defining a space on the platform between the interior sides of the side bars for receiving a test tube rack. The second side bar can be secured relative to the first side bar to fix the distance between the side bars to accommodate the test tube rack. A sheet of resilient material having first and second edges is secured along one edge to one side of the device, exteriorly of the side bars. The other edge of the sheet material is releasably secured to the other side of the device, exteriorly of the side bars, to retain a test tube rack on the platform between the side bars.

In a second embodiment of the invention, the platform is pivotally mounted about a horizontal axis. Generally, this test tube rack holder comprises a base and left and right vertical side members extending upwardly on opposite sides of the base. The holder further comprises a platform that has side panels depending from opposite sides thereof. The side panels are pivotally mounted to the side members to allow the platform to pivot about a horizontal axis.

Other objects and features will be in part apparent and in part pointed out hereinafter.

BRIEF DESCRIPTION OF THE DRAWINGS

FIG. 3 is a rear side elevation view of the test tube rack holder in the retracted position, with the resilient sheet removed for illustration purposes;

FIG. 4 is a front side elevation view of the test tube rack holder in the expanded position, with the resilient sheet removed for illustration purposes;

Corresponding reference characters indicate corresponding parts throughout the several views of the drawings.

DETAILED DESCRIPTION OF THE PREFERRED EMBODIMENTS

Figure 1:
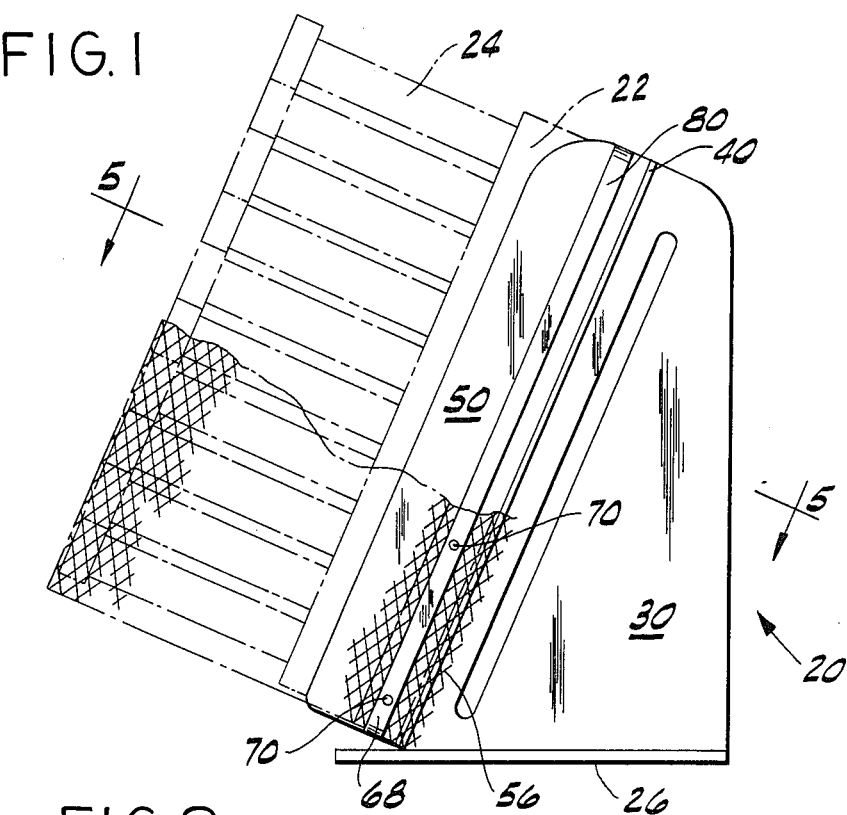
FIG. 1 is a right side elevation view of a test tube rack holder constructed according to the principles of this invention, with a test tube rack, shown in phantom, mounted therein.
Figure 2:
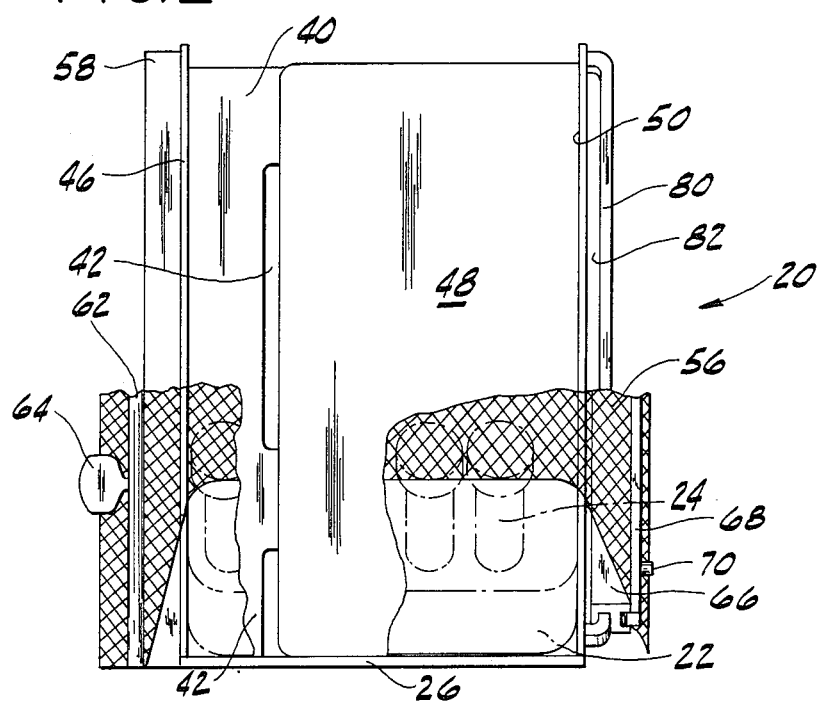
FIG. 2 is a front side elevation view of the test tube rack holder.
Figure 5:
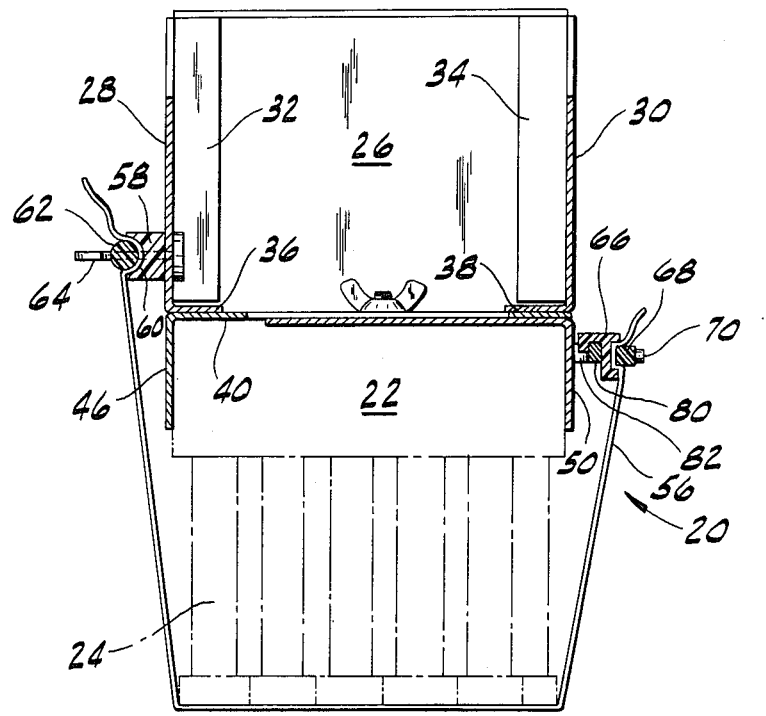
FIG. 5 is a cross-sectional view of the test tube rack holder taken along the plane of line 5—5 in FIG. 1.

A first embodiment of a test tube rack holder constructed according to the principles of this invention is indicated generally as 20 in FIGS. 1–5. As shown in FIGS. 1, 2, and 5, holder 20 is adapted to mount a test tube rack 22 (shown in phantom) containing test tubes 24 (shown in phantom) to a rotary shaker or similar piece of equipment.

Holder 20 comprises a generally horizontal base 26 and left and right vertical side members 28 and 30 extending upwardly on opposite sides of the base. The base 26 is adapted to be mounted to a shaker apparatus. Side members 28 and 30 have inwardly extending horizontal flanges 32 and 34, respectively, at their bottom edges which overlie the base and are attached thereto. Side members 28 and 30 also have upwardly, rearwardly sloping front edges, with inwardly extending flanges 36 and 38, respectively. A platform 40 extends between the flanges 36 and 38 of the side members. As best shown in FIGS. 3 and 4, platform 40 can have relieved portions 42 to save material and reduce weight. Platform 40 has two laterally extending slots 44. A first side bar 46 projects outwardly from the platform along one side.

A plate 48 is slideably mounted over the surface of the platform 40 for lateral movement relative to the platform. The plate has a second side bar 50 projecting outwardly therefrom generally parallel to the first side bar, the second side bar being laterally movable with the plate to define an adjustable space on the platform between the interior sides of the side bars for receiving test tube rack 22. Two threaded studs 52 project from the back of the plate 48 and are received in the slots 44 in the platform. Wing nuts 54 secure the threaded studs to the marginal portions of the slots in the platform to releasably secure the plate to the support. Thus, the space between the side bars for receiving the test tube rack can be adjusted.

A sheet 56 of a resilient material, such as a resilient plastic webbing or mesh, having first and second edges can be releasably secured over the platform to retain a test tube rack on the platform between the side bars. Sheet 56 may be of various commercially available resilient or flexible materials such as rubber, nylon or other plastic materials. In the preferred embodiment, an elongate bracket 58 extends along the left side member 28 parallel to the plane of the platform. The bracket 58 has a longitudinal groove 60 therein. A retaining bar 62, secured in groove 60 with threaded bolts 64, sandwiches one edge of sheet 56 against bracket 58, thereby securing the sheet to the holder 20 exteriorly of the side bars. An elongate latch member 66 is attached to the opposite side of the sheet 56. A retaining bar 68, secured to the latch member 66 with screws 70, sandwiches the sheet 56 against the latch member 66, thereby securing it.

Figure 6:
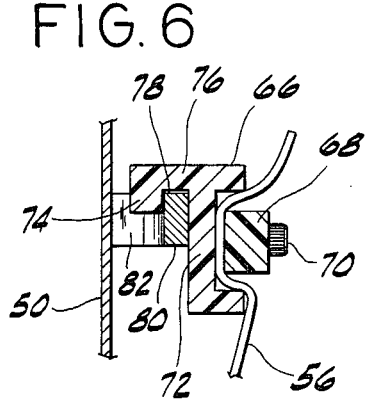
FIG. 6 is an enlarged cross-sectional view of the latching member shown in FIG. 5.

Latch member 66 is channel-shaped to engage a slot formed on the side of the holder 20. The latch member has a back 72 to which the sheet 56 is attached, and a lip 74 spaced from the back 72 by a bottom 76 to form a channel 78 therebetween. A bar 80 is mounted to the exterior side of the second side bar 50. As shown in FIGS. 2, 3, and 4, the ends of the bar 80 bend inwardly to space the middle portion of the bar from the side of the second side bar 50 to define an elongate slot 82 therebetween. The latch member 66 on the edge of the sheet 56 is adapted to engage bar 80 and slot 82. As shown in FIG. 6, the latch member 66 extends around the side and back of the bar 80, with the channel 78 receiving bar 80 and the lip 78 projecting into slot 82. The latch member is thus very quickly and easily secured exteriorly of the side bars by pulling the latch member around the bar and fitting the lip into the slot so that the bar is received in the channel. The resiliency of the sheet maintains the latch member against the bar for a secure engagement.

Sheet 56 is sized to closely fit over the platform in its retracted condition (shown in FIG. 3) to securely hold even a narrow rack, with even just one test tube. However, the sheet material is sufficiently resilient that it can fit over the platform in its expanded condition (shown in FIG. 4) to accommodate a much wider rack filled with test tubes, as shown in the drawings.

Figure 7:
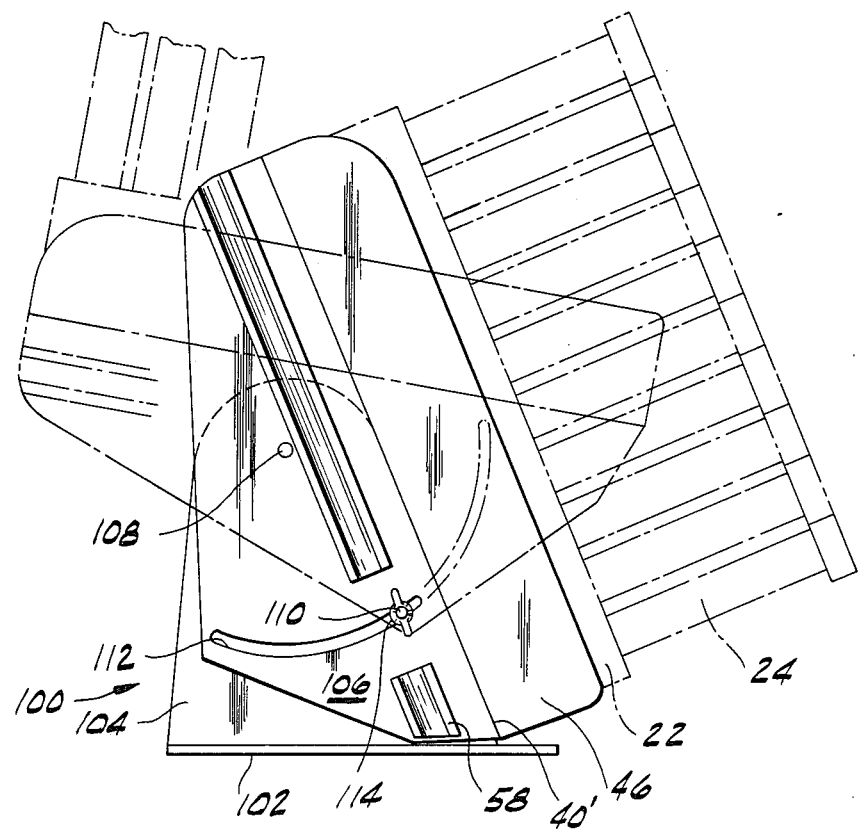
FIG. 7 is a left side elevation view of a second embodiment of a test tube rack holder constructed according to the principles of this invention, showing the rack, in phantom, in a tilted position.

A second embodiment of a test tube rack holder constructed according to the principles of this invention is indicated generally as 100 in FIG. 7. Holder 100 is similar to holder 20, except that it is constructed to pivot about a horizontal axis, and like parts are identified with like numbers. Holder 100 comprises a base 102 with two vertical side members 104 extending upwardly on opposite sides of the base. The holder 100 further comprises a platform 40', identical to the platform 40 described above, except that it has two side panels 106 depending from opposite sides thereof. The side panels 106 are pivotally mounted on pins 108 to the side members 104 to permit the platform 40' to pivot. Means is provided to secure the platform in a particular angular position. In the preferred embodiment, this means comprises a threaded stud 110 projecting from at least one of the side members 104 and received in an arcuate slot 112 in the corresponding side panel 106. A wing nut 114 is threaded over the stud 110 and can be tightened to engage the marginal portions of the arcuate slot 112 and secure the side member 104 and side panel 106 against further pivotal movement. The other parts of holder 100 can be as described above with regard to holder 20.

OPERATION

In operation, the device is mounted to a shaker. Wing nuts 54 are loosened and the plate moved laterally with respect to the platform until the side bars are appropriately spaced to receive the test tube rack 22. The rack is then placed on the platform between the side bars. The side bars are pushed together to engage the sides of the rack and wing nuts 54 are then tightened to secure the side bars in the desired position. The resilient sheet is brought over platform 40, around the test tube rack and stretched to reach beyond bar 80 until the lip of the latch member can be inserted into the slot 82. The tension of the resilient sheet 56 holds the rack 24 securely on the platform between the side bars. As described above, the resilient material is selected to be sufficiently resilient to accommodate the narrowest rack when the side bars are in their retracted position, or the widest rack, when the side bars are in their extended position. The sheet material should accommodate the rack whether it contains just one test tube or whether it is full.

The operation of holder 100 is the same as described above except that the angle of the platform 40' can be adjusted by loosening nut 114, pivoting platform 40' to the desired position, and tightening nut 114.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed:

1. A test tube rack holder for supporting a test tube rack on a shaker, the holder comprising: a base;
    a platform adapted to be mounted to the base, the platform having a surface for supporting the test tube rack;
    opposing, adjustable side-engaging members on the platform adjustable to engage the sides of the rack supported on the platform;
    a resilient sheet;
    means for releasably securing the resilient sheet to the holder over the surface of the platform to retain a test tube rack supported on the surface between the opposing side-engaging members wherein the platform is fixedly sloped relative to the base, so that the platform is supported at an angle with respect to horizontal.

2. A test tube rack holder for supporting a test tube rack on a rotary shaker, the holder comprising:
    a base;
    a platform mounted on the base;
    a first side bar projecting outwardly from the platform;
    a second side bar projecting outwardly from the platform generally parallel to the first side bar, the second side bar being laterally movable with respect to the first side bar and defining a space on the platform between the interior sides of the side bars for receiving a test tube rack;
    means for securing the second side bar relative to the first side bar to fix the distance between the side bars to accommodate a test tube rack;

a sheet of resilient material having first and second edges;

means for securing one edge of the sheet material to the holder exteriorly of the side bars;

means for releasably securing the other end of the sheet material to the holder exteriorly of the side bars to retain a test tube rack on the platform between the side bars wherein the platform is fixedly sloped relative to the base, so that the platform is supported at an angle with respect to horizontal.

3. The test tube holder according to claim 2 wherein the platform has at least one laterally extending slot therein and wherein the means for securing the second side bar comprises a stud projecting from the second side bar and means for securing the stud to the marginal porions of the slot in the platform.

4. The test tube rack holder according to claim 2 wherein the means for releasably securing the sheet material comprises means for forming a slot on the the holder exteriorly of the side bars and a latch member along the edge of the sheet for engaging the slot and securing the sheet.

5. The test tube rack holder according to claim 4 wherein the slot forming means comprises a bar mounted to the holder in spaced relation to define a slot therebetween and wherein the latch member comprises an elongate member secured at the edge of the sheet, the member having a generally channel shape, with a back, a lip and a bottom separating the back and lip to form a channel therebetween, the latch member adapted to extend around the bar with said channel receiving the bar and the lip extending into the slot.

6. A test tube rack holder for supporting a test tube rack on a rotary shaker, the holder comprising:

a horizontal base;

left and right vertical side members on opposite sides of the base;

a platform extending between the side members;

a first side bar projecting outwardly from the platform;

a second side bar projecting outwardly from the platform generally parallel to the first side bar, the second side bar being laterally movable with respect to the first side bar and defining a space on the platform between the interior sides of the side bars for receiving a test tube rack;

means for securing the second side bar relative to the first side bar to fix the distance between the side bar to accommodate a test tube rack;

a sheet of resilient material having first and second edges;

means for securing one edge of the sheet material to one side of the holder, exteriorly of the side bars;

means for releasably securing the other end of the sheet material to the other side of the holder, exteriorly of the side bars to retain a test tube rack on the platform between the side bars wherein the platform is fixedly sloped relative to the base, so that the platform is supported at an angle with respect to horizontal.

7. The test tube rack holder according to claim 6 wherein the means for releasably securing the sheet material comprises means for forming a slot on the side of the holder and a latch member along the edge of the sheet for engaging the slot and securing the sheet.

8. The test tube rack holder according to claim 6 wherein the slot forming means comprises a bar mounted to the side of the holder in spaced relation to define a slot therebetween and wherein the latch member comprises an elongate member secured at the edge of the sheet, the member having a generally channel shape, with a back, a lip and a bottom separating the back and lip to form a channel therebetween, the latch member adapted to extend around the bar with channel receiving the bar and the lip extending into the slot.

9. The test tube holder according to claim 6 wherein the platform has at least one laterally extending slot therein and wherein the means for securing the second side bar comprises a threaded stud projecting from the second side bar and a nut for securing the threaded stud to the marginal portions of the slot in the platform.

10. The test tube rack holder according to claim 6 wherein one end of the sheet is secured to a side member of the holder and wherein the other end of the sheet is secured to the exterior side of the second side bar.

* * * * *